US011130544B2

(12) United States Patent
Mcainish (10) Patent No.: US 11,130,544 B2
(45) Date of Patent: Sep. 28, 2021

(54) RACING BICYCLE

(71) Applicant: Verve Design S.R.L., Villa D'Adda (IT)

(72) Inventor: Richard Kenneth Mcainish, Villa D'Adda (IT)

(73) Assignee: Aperta B.V., CN Almere (NL)

( * ) Notice: Subject to any disclaimer, the term of this patent is extended or adjusted under 35 U.S.C. 154(b) by 252 days.

(21) Appl. No.: 16/338,988

(22) PCT Filed: Oct. 3, 2017

(86) PCT No.: PCT/EP2017/075030
§ 371 (c)(1),
(2) Date: Apr. 2, 2019

(87) PCT Pub. No.: WO2018/065383
PCT Pub. Date: Apr. 12, 2018

(65) Prior Publication Data
US 2020/0039601 A1    Feb. 6, 2020

(30) Foreign Application Priority Data

Oct. 3, 2016    (IT) .......................... 102016000099013

(51) Int. Cl.
*B62K 21/02*    (2006.01)
*B62K 21/18*    (2006.01)
*B62K 21/12*    (2006.01)

(52) U.S. Cl.
CPC .............. *B62K 21/18* (2013.01); *B62K 21/02* (2013.01); *B62K 21/12* (2013.01)

(58) Field of Classification Search
CPC ........ B62K 21/18; B62K 21/02; B62K 21/12; B62K 3/04; B62K 21/125; B62J 17/00
See application file for complete search history.

(56) References Cited

U.S. PATENT DOCUMENTS 3,811,705 A    5/1974  D'Ambra
3,865,402 A *  2/1975  Zenser ................... B62K 25/06
                                                  280/276

(Continued)

FOREIGN PATENT DOCUMENTS

CN       2243431       12/1996
DE    202004010575    10/2004

OTHER PUBLICATIONS

International Search Report and Written Opinion of PCT/EP2017/075030 dated Jan. 26, 2018, 11 pages (English).

*Primary Examiner* — Minnah L Seoh
*Assistant Examiner* — Marlon A Arce
(74) *Attorney, Agent, or Firm* — Rankin, Hill & Clark LLP (57) ABSTRACT

Racing bicycle, in particular for time trials, triathlons or suchlike, comprising a frame provided with a head tube, a top tube and a fork connectable on one side to the head tube and on the other side to a wheel of the bicycle; in the fork one or more apertures are made for the passage of the air, made between the external surface of the wheel and the top of the head tube; the one or more apertures are configured to allow at least part of the stream of air that hits the bicycle to pass in a central zone of the bicycle and in proximity to the frame; the top tube is positioned above the one or more apertures in order to leave the central zone free, and therefore not interfere with the stream of air passing in the central zone and below the top tube.

11 Claims, 5 Drawing Sheets

(56) References Cited

U.S. PATENT DOCUMENTS 3,964,765 A * 6/1976 Zenser .................. B62K 25/06
280/276
5,924,714 A * 7/1999 Farris .................... B62K 21/20
280/276

* cited by examiner fig. 2 fig. 1 fig. 3 fig. 4 fig. 5 fig. 6

RACING BICYCLE

FIELD OF THE INVENTION

The present invention concerns a racing bicycle, in particular a bicycle used in sports and competitions, such as for example a racing bicycle for time trials, triathlons or suchlike.

BACKGROUND OF THE INVENTION

It is known that racing bicycles, in particular bicycles used for time trials or triathlons, are built according to certain construction requirements, in particular regarding the frame, handlebars, wheels, and hence the position that the cyclist assumes during pedaling.

These bicycles are therefore made so as to meet requirements of both biomechanics and aerodynamics, so the design is intended to meet both the effective positioning and delivery of power by the cyclist, as well as an effective contrast against the air friction phenomena.

The parameters considered in the manufacture of bicycles must also often comply with international regulations, generally prescribed by the International Cycling Union (UCI).

The frame of a bicycle, for example of a racing bicycle, can generally be formed by a structure substantially comprising a double triangle, basically defined by a common seat tube at the ends of which are connected, on one side, the top tube and the down tube that converge towards the head tube and, on the other side, the oblique blades and the lower blades, which converge in the gear attachment and the rear dropout.

However, there are also frames made differently, for example without the down tube or the seat tube.

Figure 1:
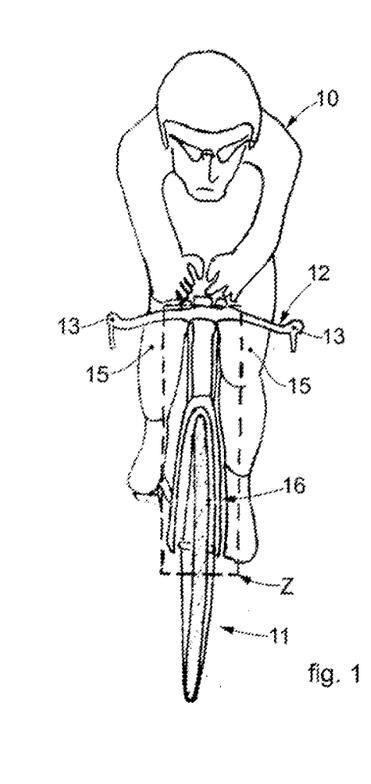
FIG. 1, as mentioned, is a front schematic view of a known bicycle with a cyclist on the saddle and pedaling.

FIG. 1 of the attached drawings shows a schematic and front view of a cyclist 10 riding a bicycle 11, for example a racing bicycle, and in particular a bicycle for time trials of a known type. The bicycle 11 comprises handlebars 12 provided not only with the traditional lateral grips 13 but also with central grips sufficiently close to each other and able to allow the cyclist to grip the handlebars 12 as in the situation shown, that is, with the hands close to each other and in a substantially central position above the handlebars 12.

Figure 2:
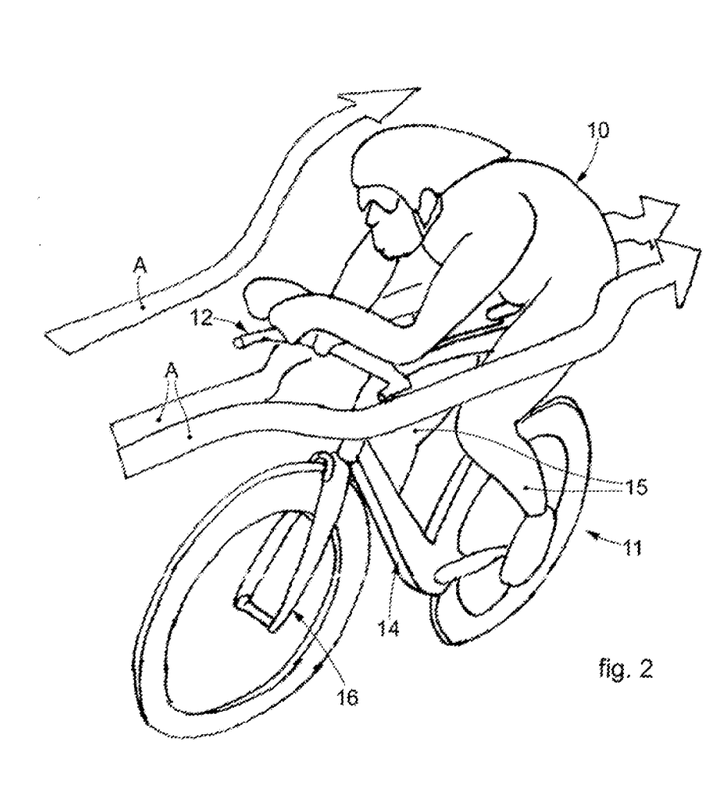
FIG. 2, as mentioned, is a schematic three-dimensional view of the bicycle and the cyclist shown in FIG. 1.
Figure 3:
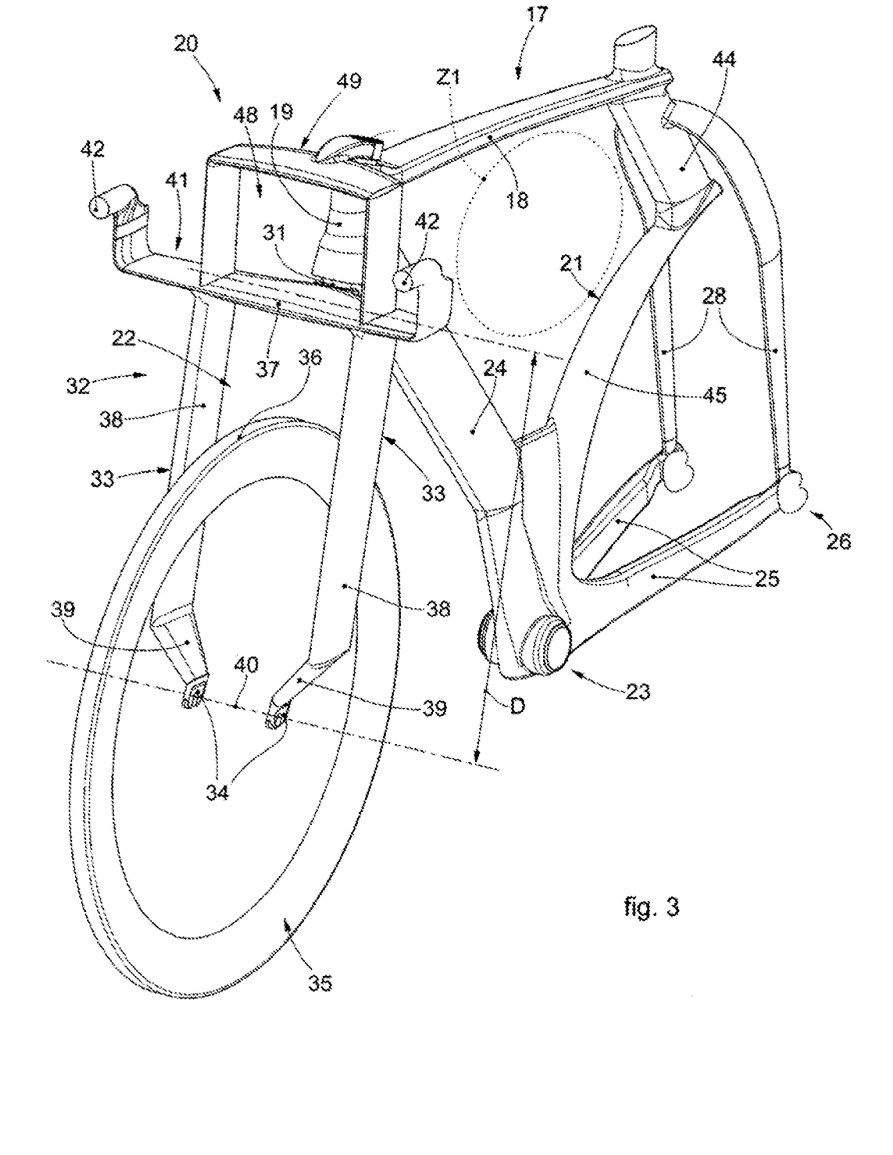
FIG. 3 is a three-dimensional view of a racing bicycle according to the invention.
Figure 4:
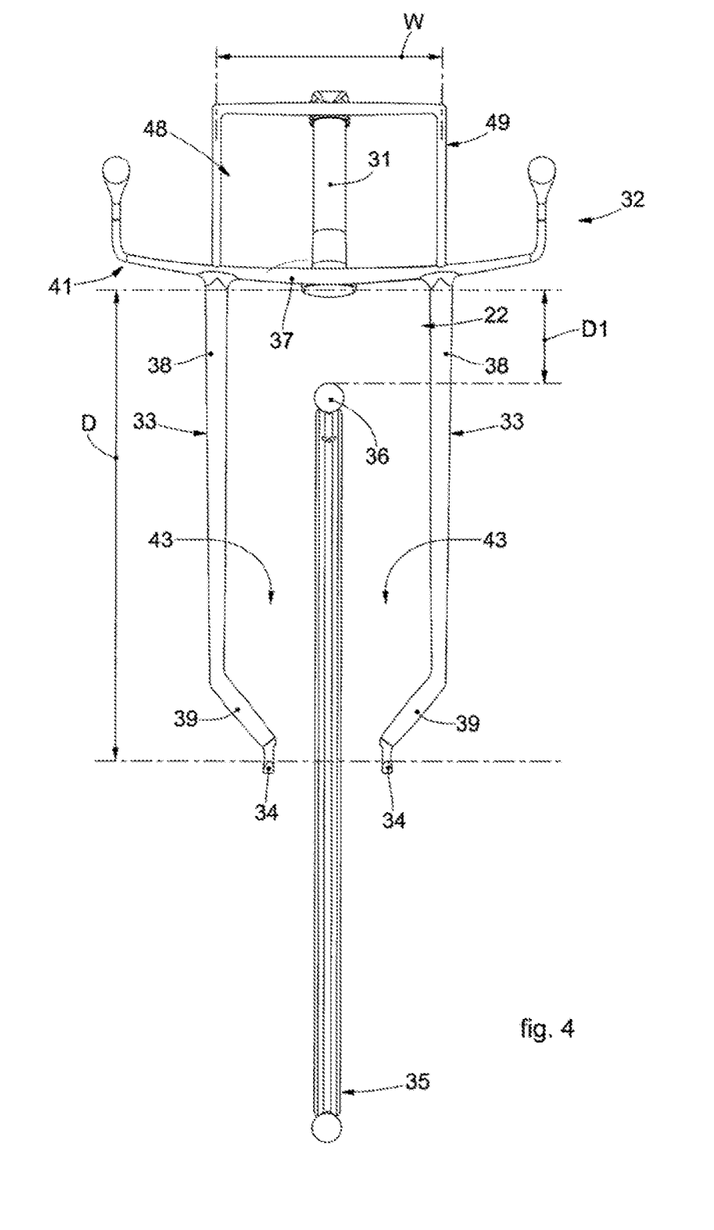
FIG. 4 is a front view of the front fork of the racing bicycle according to the invention.

As can be seen from FIG. 2, the frame 14 of the bicycle 11 is sized in such a way as to allow the cyclist 10 an aerodynamic position in which the head and shoulders are extremely low. The cyclist's legs, moreover, are typically very close to the frame 14 of the bicycle 11.

This position of the cyclist 10 and the general conformation of the frame 14, see FIG. 1 again, create on the front part of the cyclist 10 and bicycle 11, a zone Z where the passage of air is substantially prevented. The zone Z is filled mainly by the legs 15 of the cyclist 10 and by the traditional fork 16 connected to the frame 14.

The result of the constructional parameters of frame 14 and fork 16 is therefore the creation of an extensive front surface that adversely affects the aerodynamic aspect of the bicycle and that forces the air to pass around and above the cyclist, see for example, the arrows A that represent the traditional air streams that hit the bicycle 11 and cyclist 10 during normal pedaling.

Bicycles currently therefore have obvious aerodynamic limits, due above all to this large front surface that is created mainly because of the current construction of the fork.

Other bicycles, however, which are not suitable for use as racing or competitive bicycles, in particular for time trials, triathlons, or suchlike, are described in documents DE-U-202004010575, CN-Y-2243431, U.S. Pat. Nos. 3,811,705 and 3,770,295.

The bicycles and forks described in these documents do not clearly meet the requirements of biomechanics and aerodynamics required in racing or competitive bicycles, in particular bicycles for time trials, triathlons or suchlike.

For example, DE-U-202204010575 and U.S. Pat. No. 3,811,705 describe typical roadster bicycles in which, underneath the horizontal tube or top tube, no suitable air passage zones are made, able to increase the aerodynamic characteristics of the structure.

On the contrary, the horizontal or top tubes of such bicycles, given their position, interfere with any possible stream of air arriving from the front zone of the bicycle.

The front forks of such bicycles, moreover, do not have characteristics of size and/or shape such as to allow at least a part of the stream of air that hits the bicycle to pass in a central zone of the bicycle and close to the frame, and therefore substantially in a zone below the horizontal tube or top tube, without interfering with the stream of air.

The characteristics of size of the forks in this regard also have to be suitably defined in order to guarantee an effective aerodynamics of the bicycle, especially of a racing bicycle such as a bicycle for time trials, triathlons or suchlike, where the construction details, also of size or shape, can considerably affect the performance of the bicycle.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to make a racing bicycle, in particular for time trials and triathlons, which can overcome at least one of the disadvantages of the state of the art.

One purpose of the present invention is therefore to obtain a racing bicycle that is efficient both from a biomechanical viewpoint of power delivery, and also from an aerodynamic point of view, which therefore drastically limits the impact of the air on the front part of the bicycle during pedaling.

Another purpose of the present invention is to obtain a racing bicycle with excellent ergonomics and performance, in particular for time trials and triathlons.

Another purpose is to obtain a racing bicycle that has adequate air passage zones, in particular on the front part, which traditionally creates a kind of barrier against an effective stream of air.

Another purpose of the present invention is to obtain a fork for a racing bicycle that can overcome the aerodynamic limits of known forks.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns a racing bicycle, in particular for time trials, triathlons or suchlike, comprising a frame provided with a head tube, a top tube and a fork connectable on one side to the head tube and on the other side to a wheel of the bicycle. According to one aspect of the invention, in the fork one or more apertures are made for the passage of the air, made between the external surface of the wheel and the top of the head tube; the apertures are configured to allow at least part of the stream of air that hits the bicycle to pass in a central zone of the bicycle and in proximity to the frame; the top tube is positioned above the one or more apertures in order to leave the central zone free, and therefore not interfere with the stream of air passing in the central zone and below the top tube.

Preferably, the bicycle comprises a first aperture defined between the external surface of the wheel and the base of the head tube, the height of the aperture is comprised between 10% and 30% of the distance defined between the base of the head tube and the extreme part of the fork where supports are positioned to connect the fork to the wheel.

The distance defined between the base or crown of the head tube and the supports disposed in correspondence with the axis of the wheel can be comprised between 425 to 575 mm and particularly between 475 to 525 mm.

This distance represents substantially the length or height of the fork.

According to other aspects of the invention, the fork comprises two arms located at a reciprocal distance so as to obtain suitable spaces for the passage of the air between them and the wheel.

The arms can be provided with first substantially parallel segments and second segments converging toward a connection pin to the wheel.

In some embodiments, the distance that divides the arms of the fork is variable between 110 mm and 150 mm.

The fork can comprise a joining portion of the arms, positioned in proximity to the head tube and defining the upper part of the aperture.

The fork can comprise another aperture defined by a substantially portal-like structure situated above the joining portion of the arms.

According to other aspects of the invention, the bicycle comprises handlebars made in a single piece with the fork.

According to other aspects of the invention, the top tube is connected on one side to the head tube and on the other side to a tubular element associated with a seat tube of the frame of the bicycle. However, the frame could also be without the top tube.

The invention also concerns a fork for a racing bicycle comprising a pair of arms between which one or more apertures with aerodynamic functions are made, so as to allow a consistent front passage of the air through the fork and therefore in a central passage zone.

The aperture is comprised, after assembly, between 10% and 30% of the total height of the fork.

The invention also concerns a method to make a racing bicycle, comprising making a frame provided with a top tube, a head tube with which a fork is associable, connectable to a wheel and configured so as to make one or more apertures in it and at least between the external surface of the wheel and the top of the head tube, able to allow at least part of the stream of air that hits the bicycle to flow in a central zone of the bicycle, and in proximity to the frame.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

With reference to the attached drawings, a racing bicycle 20 according to the invention comprises a frame 17 made, for example, of metal material, metal alloys, aluminum alloys, carbon fibers or suchlike.

The frame 17 comprises a first tube 18, generally known in the field by the name of a top tube or horizontal tube.

The top tube 18 can be disposed in a direction parallel to the road surface or can assume different inclinations with respect to the road surface, according to the construction methods of the frame 17.

The top tube 18 is connected at one end with a pipe or head tube 19 and at the other end with a first end of a seat tube 21.

In FIG. 2, the seat tube 21 is substantially formed by two tubular elements 44 and 45 having different inclinations, but it could also be made differently.

The seat tube 21 is also connected at the bottom to a central movement box 23.

The central movement box 23, with which substantially at least one crown 46 and a pair of pedal cranks 47 are associated, is connected at one end to an end of a down tube 24, the other end of which is connected to the head tube 19.

The box 23 is also connected to one end of a pair of lower blades 25, the other ends of which are connected to a fork 26 for engaging the rear wheel 27 of the racing bicycle 20.

In this case too, the lower blades 25 can assume different inclinations with respect to the road surface, depending on the construction modes.

First ends of a pair of oblique blades 28 are also connected to the fork 26, the other ends of which are connected to the seat tube 21.

Normally, at the top, the seat tube 21 has an aperture to insert a support 29 for a saddle 30. In this case, the support 29 for the saddle will be inserted in the tubular element 44 of the seat tube 21.

In the head tube 19, a tubular member 31 of a fork 32 is inserted, said fork 32 being formed by at least one pair of arms 33, which on one side provide a reciprocal connection portion 37 and on the other side have suitable supports 34 which can be inserted in a pin 40 of the front wheel 35 of the racing bicycle 20.

The portion 37 that connects the arms 33 is integral with the tubular element 31 that can be inserted into the head tube 19.

The tubular element 31 of the fork 32 can be connected to the head tube 19 by means of a bayonet connection system or other connection system.

The connection portion 37 can be part of the handlebars 41 integral with the fork 32.

Grip elements 42 are also partially shown on the handlebars 41.

Advantageously, the arms 33 with which the fork 32 is provided have an extension such that between the outer surface 36 of the front wheel 35 and the base of the head tube 19, where the connection portion 37 of the arms 33 is substantially located, an aperture 22 is made, with aerodynamic and air passage functions: the air is schematically indicated by the flow lines A1.

In order to guarantee an appropriate amplitude or height of the aperture 22, the top tube 18 could be made with a suitable inclination from the bottom upwards from the connection end with the seat tube 21 to the connection end with the head tube 19.

In the present example, the top tube 18 is substantially raised with respect to a normal bicycle, and this raising is determined on one side by the fork 32 and on the other side by the tubular element 44 of the seat tube 21.

The two arms 33 each comprise a first substantially vertical segment 38 and a second segment 39 converging toward the pin 40 of the front wheel 35.

Advantageously, moreover, the reciprocal connection portion 37 of the arms 33 has an extension such that these elements are sufficiently distanced from the front wheel 35, so as to allow the air to pass in spaces 43 made between the arms 33 and the wheel 35.

The fork 32 also comprises, above the portion 37, another air passage 48, defined by a substantially portal-shaped structure 49.

The aperture 48, in other words, is defined between the portion 37 and the top of the head tube 19.

The top tube 18 is substantially positioned at the height of the top of the head tube 19.

The distance D between the supports 34 that connect the fork 32 to the wheel 35 and the base of the head tube 19 which is substantially at the same height as the base of the tubular element 31 can vary between 425 to 575 mm and particularly between 475 to 525 mm.

Said distance D represents substantially the length or height of the fork 32.

It has been found, surprisingly, that the distance D varying between 425 to 575 mm and particularly between 475 to 525 mm allows to obtain optimum performance of the bicycle from the aerodynamic and biomechanical point of view.

The characteristics of size of the fork 32 are, in fact, suitably defined and predetermined, in order to guarantee an efficient aerodynamics of the racing bicycle 20, for example for time trials, triathlons or suchlike. The construction details, of both size and shape, can in fact considerably affect the performance and behavior of the bicycle 20 during races.

In this regard, in order to obtain a fork 32 for a racing bicycle 20 with effective parameters of size, the distance D1 between the outer surface 36 of the front wheel 35 and the base of the tubular element 31 and therefore substantially of the head tube 19, is comprised between 10% and 30% of the distance D defined previously, hence the distance D between the supports 34 of the fork 32 and the head tube 19.

This distance D1 substantially represents the height of the air passage aperture 22 between the wheel 35 and the head tube 19.

It has been found experimentally that this ratio between D1 and D comprised between 10% and 30% is very advantageous both for the aerodynamic characteristics of the racing bicycle 20, and also in relation to pedaling efficiency and positioning by the user, therefore in relation to the biomechanical characteristics of the racing bicycle 20.

The present racing bicycle 20 is therefore advantageously provided with a front fork 32 sized so as to allow to make one or more apertures 22, 48 for the air to pass between the outer surface of the front wheel 35 of the bicycle 20 and the top of the head tube 19.

From these apertures 22 and 48, schematically following the flow A1, the air can flow toward the rear part of the racing bicycle 20, without encountering zones of obstructions and barriers as in known bicycles.

Figure 5:
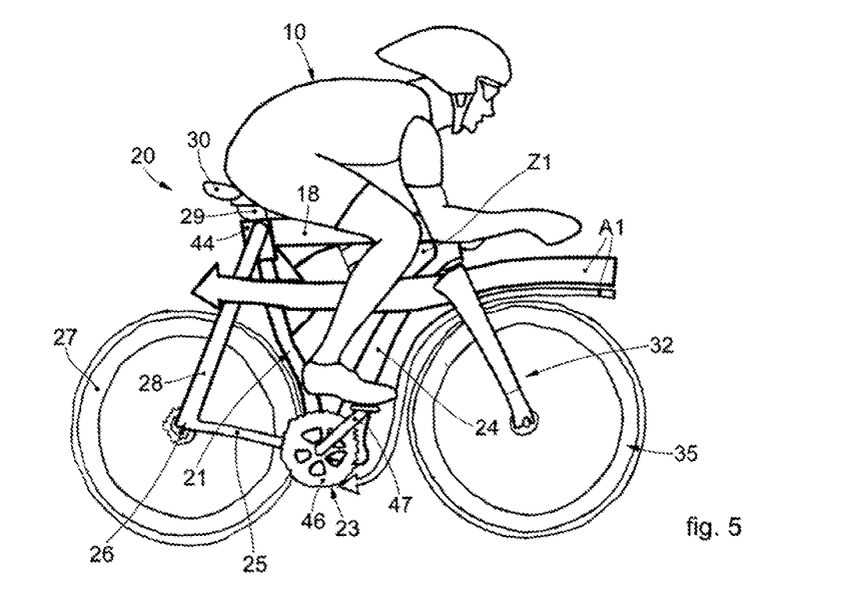
FIG. 5 is a schematic and lateral elevation view of the racing bicycle according to the invention.

The flow A1 can also be partially directed to the lower part of the racing bicycle 20 so that the air flows under the central movement box 23, see FIG. 5.

The flow A1 of air then passes into a central zone Z1 of the racing bicycle 20, substantially without encountering any constraints or obstacles for its passage, thus without interfering, in an aerodynamically negative way, with parts of the racing bicycle.

The horizontal or top tube 18, in fact, is located above these apertures 22, 48 and therefore does not interfere with the flow A1 of air.

Figure 6:
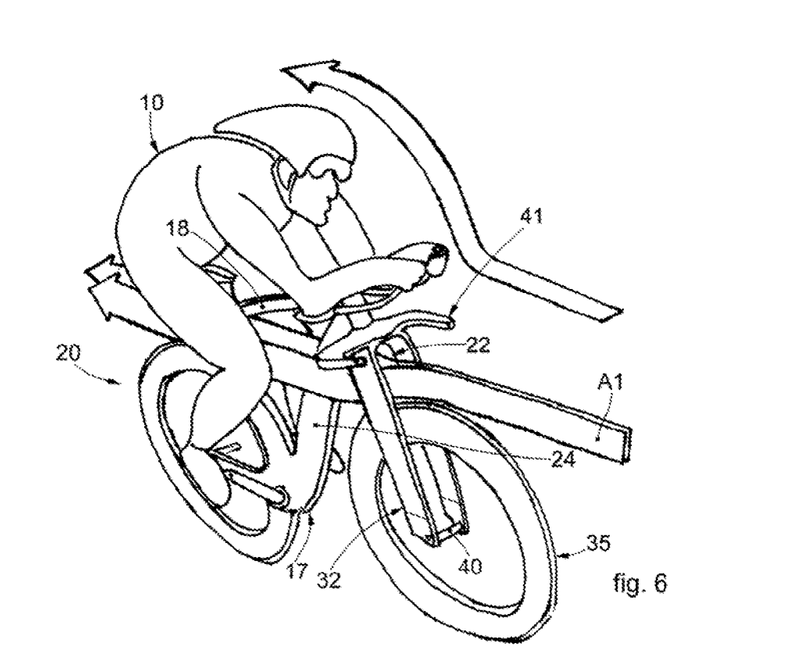
FIG. 6 is a schematic three-dimensional view of the racing bicycle according to the invention.

The arms 33 of the fork 32 can also be located at a suitable distance W, so that the air can advantageously flow into the spaces 43, see FIG. 6, made between the front wheel 35 and the arms 33. In this case, substantially, the cyclist's legs would be positioned behind the arms 33 of the fork 32 and would thus interfere minimally with the stream of air that hits the front of the racing bicycle 20.

The distance W that divides the two arms 33 can vary between 110 and 150 mm. It has been found that these size ranges guarantee optimum aerodynamic efficiency, which is extremely important, as we said above, to guarantee adequate performance for the racing bicycle 20.

FIGS. 7a to 7f show some examples of sections Sa, Sb, Sc, Sd, Se and Sf of the arms 33 of the fork 32. The sections Sa-Sf are considered transversely to the arms of the fork.

Figures 7A, 7B, 7C:
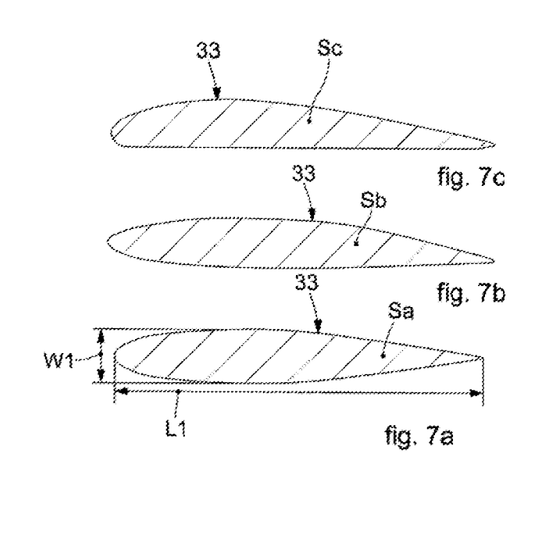
FIGS. 7*a*-7*f* are section views that show different fork shapes in section.
Figure 7D:
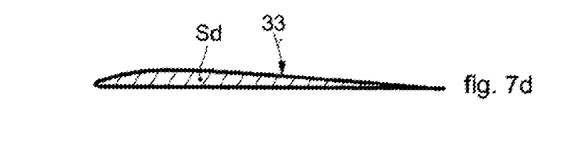
Figures 7E, 7F:
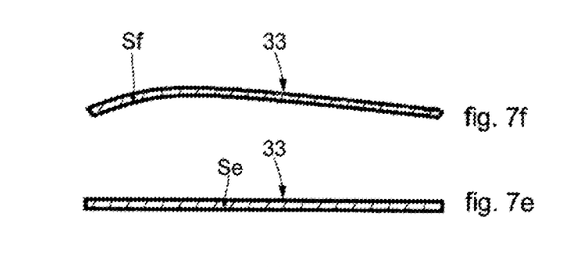

In the case of a fork with arms 33 with a symmetrical section, see section Sa, the ratio between the length L1 of that section and its width W1 is preferably greater than or equal to three. This ratio between L1 and W1 can be, for example, four or five.

Other fork sections, for example, see sections Sb, Sc, Sd and Sf, can have variously asymmetric profiles.

In order to further improve the aerodynamics of the present bicycle, disc brakes could also be used.

It is clear that modifications and/or additions of parts may be made to the bicycle and fork as described heretofore, without departing from the field and scope of the present invention.

It is also clear that, although the present invention has been described with reference to some specific examples, a person of skill in the art shall certainly be able to achieve many other equivalent forms of bicycle and fork, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Racing bicycle for time trials and triathlons, comprising:
   a frame provided with a head tube and a top tube;
   a fork including two arms, which on one side are connected to each other via a joining portion and on the other side have supports connecting the fork to a wheel of the bicycle,
   wherein the joining portion is integral with a tubular element of the fork inserted in the head tube,
   wherein one or more apertures are made in the fork for the passage of the air, said one or more apertures being made between an external surface of said wheel and a top of the head tube, said one or more apertures being configured to allow at least part of the stream of air that hits the bicycle to pass in a central zone of the bicycle and in proximity to the frame, said top tube being positioned above said one or more apertures in order to leave said central zone free, and therefore not interfere with the stream of air passing in said central zone and below said top tube, and
   wherein the joining portion is part of handlebars which are made in a single piece with the fork and on which grip elements are provided.

2. Bicycle as in claim 1, wherein said one or more apertures includes a first aperture defined between the external surface of said wheel and the base of the head tube, the height of said first aperture being comprised between 10% and 30% of the distance defined between the base of the head tube and the extreme part of the fork where said supports are positioned to connect the fork to the wheel.

3. Bicycle as in claim 2, wherein said distance defined between the base of the head tube and said supports is comprised between about 425 to 575 mm and particularly between 475 to 525 mm.

4. Bicycle as in claim 1, wherein said two arms are located at a reciprocal distance so as to obtain suitable spaces for the passage of the air between them and the wheel.

5. Bicycle as in claim 4, wherein said two arms are provided with first substantially parallel segments and second segments converging toward a connection pin to the wheel.

6. Bicycle as in claim 4, wherein said reciprocal distance is comprised between 110 mm and 150 mm.

7. Bicycle as in claim 2, wherein said joining portion of said two arms positioned in proximity to the head tube defines an upper part of said first aperture.

8. Bicycle as in claim 7, wherein said fork comprises another aperture defined by a substantially portal-like structure situated above said joining portion of the arms.

9. Bicycle as in claim 1, wherein the top tube is connected on one side to the head tube and on the other side to a tubular element associated with a seat tube of the frame of the bicycle.

10. Bicycle as in claim 1, wherein said head tube has a height comprised between about 90 mm and about 120 mm.

11. Method to make a racing bicycle for time trials and triathlons as in claim 1, the method comprising:
   making the frame provided with the top tube and the head tube;
   connecting the fork on one side to the head tube and on the other side to the wheel; and
   making said one or more apertures in the fork at least between the external surface of the wheel and the top of the head tube, said one or more apertures configured to allow at least part of the stream of air that hits the bicycle to flow in the central zone of the bicycle, below the top tube and in proximity to the frame.

* * * * *